(12) United States Patent
Kaneko et al.

(10) Patent No.: US 8,706,502 B2
(45) Date of Patent: Apr. 22, 2014

(54) ELECTRONIC EQUIPMENT AND TELEVISION RECEIVER UTILIZING MULTIMODAL MULTIFUNCTION VOICE COMMANDS

(75) Inventors: Mayumi Kaneko, Daito (JP); Naoki Yamamoto, Daito (JP); Kenji Okamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1797 days.

(21) Appl. No.: 11/755,375

(22) Filed: May 30, 2007

(65) Prior Publication Data

US 2007/0282611 A1     Dec. 6, 2007

(30) Foreign Application Priority Data

May 31, 2006   (JP) ................................. 2006-152045

(51) Int. Cl.
  *G10L 21/00*   (2013.01)
  *H03G 3/20*    (2006.01)
  *G10L 15/26*   (2006.01)
  *G10L 25/78*   (2013.01)

(52) U.S. Cl.
  CPC ............... *G10L 15/265* (2013.01); *G10L 25/78* (2013.01)
  USPC .......................................... 704/275; 381/110

(58) Field of Classification Search
  USPC ........................................................ 704/275
  See application file for complete search history.

(56) References Cited

U.S. PATENT DOCUMENTS

| | | | | |
|---|---|---|---|---|
| 5,774,859 A | * | 6/1998 | Houser et al. | 704/275 |
| 5,982,355 A | * | 11/1999 | Jaeger et al. | 345/161 |
| 6,718,307 B1 | * | 4/2004 | Buil et al. | 704/270 |
| 7,321,857 B2 | * | 1/2008 | Rodriguez et al. | 704/275 |
| 7,706,553 B2 | * | 4/2010 | Brown | 381/110 |
| 2002/0044068 A1 | * | 4/2002 | Geurts et al. | 340/825.72 |
| 2002/0052746 A1 | | 5/2002 | Handelman | |
| 2004/0128137 A1 | * | 7/2004 | Bush et al. | 704/275 |
| 2005/0031127 A1 | * | 2/2005 | Gosior et al. | 381/2 |
| 2006/0169903 A1 | * | 8/2006 | Mahvi | 250/338.3 |

FOREIGN PATENT DOCUMENTS

| | | |
|---|---|---|
| JP | 4-338817 A | 11/1992 |
| JP | 6-327842 A | 11/1994 |
| JP | 10-133848 A | 5/1998 |
| JP | 2002-287793 A | 10/2002 |
| JP | 2004-260544 A | 9/2004 |

OTHER PUBLICATIONS

European Search Report dated Nov. 13, 2009 (eight (8) pages).

(Continued)

*Primary Examiner* — Farzad Kazeminezhad
(74) *Attorney, Agent, or Firm* — Crowell & Moring LLP

(57) ABSTRACT

Disclosed an is an electronic equipment including: a command information storage section to store command pieces for controlling the electronic equipment each associated with a plurality of processing contents pertaining respectively to operation control in a plurality of operation states; a speech information obtainment section to obtain speech information; a command information extraction section to perform speech recognition of the obtained speech information so as to extract the corresponding command information stored in the command information storage section; a judgment section to judge an operation state of the electronic equipment when the command information is extracted; a control section to extract one of the plurality of pieces of control information associated with the extracted command information from the command information storage section based on the judged operation state of the electronic equipment so as to control the television receiver based on the extracted control information.

6 Claims, 4 Drawing Sheets

| COMMAND INFORMATION | OPERATION STATE OF EQUIPMENT | PROCESSING CONTENTS | CONTROL INFORMATION |
|---|---|---|---|
| THERE | DURING VIDEO PICTURE RECEPTION | DISPLAY STILL IMAGE OF PRESENT VIDEO PICTURE | ... |
| | DURING CONTINUOUS TUNING WITH CH UP BUTTON | INTERRUPT TUNING WITH CH UP BUTTON TO TUNE PRESENT CH | ... |
| | DURING VOLUME-UP CONTINUOUS OPERATION | INTERRUPT VOLUME-UP OPERATION TO SET PRESENT AUDIO VOLUME | ... |
| ⋮ | ⋮ | ⋮ | ⋮ |
| ⋮ | ⋮ | ⋮ | ⋮ |

(56) References Cited

OTHER PUBLICATIONS

European Office Action dated May 17, 2010 (Five (5) pages).

Japanese Office Action dated Dec. 7, 2010 including English-language translation (Four (4) pages).

Japanese Office Action dated Apr. 5, 2011 including English-language translation (Four (4) pages).

* cited by examiner

FIG.2

| COMMAND INFORMATION | OPERATION STATE OF EQUIPMENT | PROCESSING CONTENTS | CONTROL INFORMATION |
|---|---|---|---|
| THERE | DURING VIDEO PICTURE RECEPTION | DISPLAY STILL IMAGE OF PRESENT VIDEO PICTURE | ... |
| | DURING CONTINUOUS TUNING WITH CH UP BUTTON | INTERRUPT TUNING WITH CH UP BUTTON TO TUNE PRESENT CH | ... |
| | DURING VOLUME-UP CONTINUOUS OPERATION | INTERRUPT VOLUME-UP OPERATION TO SET PRESENT AUDIO VOLUME | ... |
| | ... | ... | ... |
| ... | | | ... |

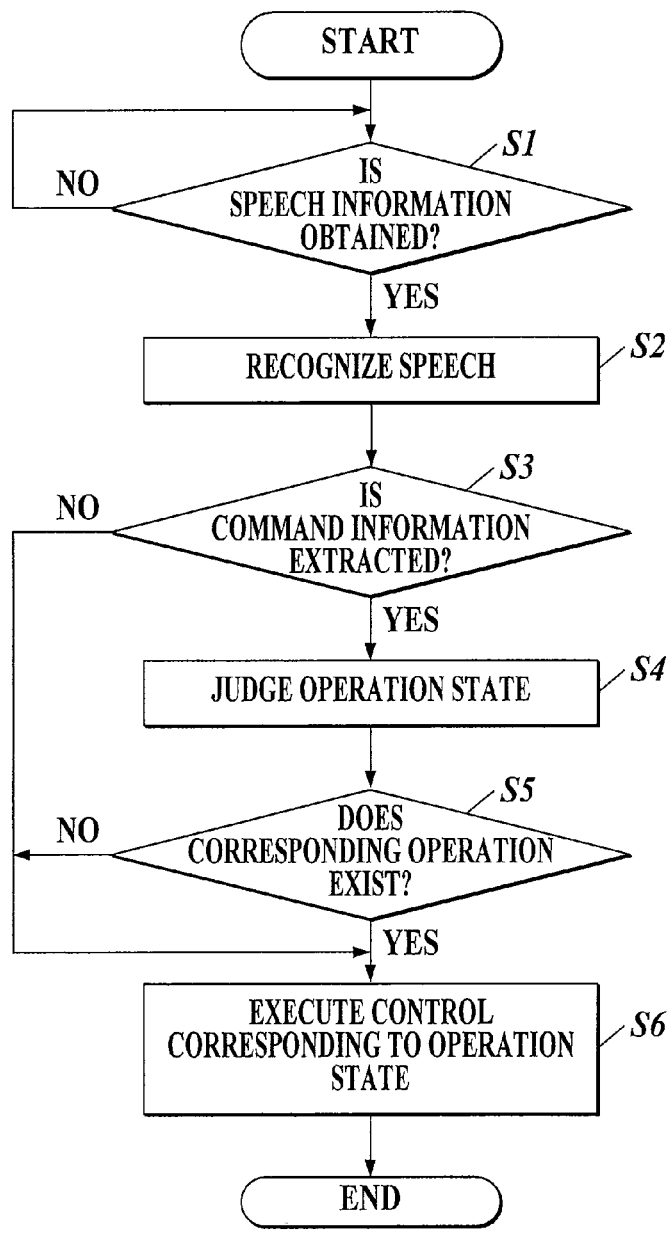

ELECTRONIC EQUIPMENT AND TELEVISION RECEIVER UTILIZING MULTIMODAL MULTIFUNCTION VOICE COMMANDS

BACKGROUND OF THE INVENTION

1. Field of the Invention

The present invention relates to an electronic equipment and a television receiver, both capable of performing various kinds of control based on speech recognition.

2. Description of Related Art

In recent years, as an electronic equipment such as a television and a video recorder has been becoming more multifunctional and more highly-functional, an equipment capable of dealing with various functions and capable of being easily operated has been required. The electronic equipment using speech recognition technology for such operations is now used.

As such electronic equipment, for example, a program information display apparatus having a speech recognition function is known (see Japanese Patent Application Publication Laid-open No. 2004-260544). By such a speech recognition function, the electronic equipment obtains the program information of a program displayed on a television receiver and of a program included in a program retrieval result in advance, and enables a user to retrieve program information by natural colloquialisms including demonstrative pronouns and pre-noun adjectivals by referring to the program information obtained in advance when the demonstrative pronouns and the pre-noun adjectivals are recognized as speech to display the program information on a display.

Moreover, there is known the command processing apparatus responding to a user based on the conjecture of user's intention from a past command execution history even if the user does not transmit any concrete object command like "Please do as usual" (see Japanese Patent Application Publication Laid-open No. 2002-287793).

However, because the apparatus disclosed in the Japanese Patent Application Publication Laid-open No. 2002-287793 performs control based on the past command execution history, the apparatus sometimes cannot execute suitable control corresponding to the operation state of the equipment if the same command "Please do as usual" is input in a different operation state.

SUMMARY OF THE INVENTION

It is an object of the present invention to provide an electronic equipment and a television receiver capable of performing suitable control corresponding to the operation state of the equipment even if the same command is input.

In order to accomplish the above object, in accordance with a first aspect of the invention, a television receiver includes: a command information storage section to store command information for controlling the television receiver associated with a plurality of pieces of control information pertaining respectively to operation control in a plurality of operation states; a speech information obtainment section to obtain speech information; a command information extraction section to perform speech recognition of the speech information obtained by the speech information obtainment section so as to extract the corresponding command information stored in the command information storage section; a judgment section to judge the operation state of the television receiver when the command information is extracted by the command information extraction section; a control section to extract one of the plurality of pieces of control information associated with the command information extracted by the command information extraction section from the command information storage section based on the operation state of the television receiver judged by the judgment section so as to control the television receiver based on the extracted control information; a setting section to set user-desired customized command information corresponding to speech information obtained by the speech information obtainment section; and a command information registration section to register the customized command information set by the setting section associated with a user-desired operation state of the television receiver and the control information corresponding to the user-desired operation state, in the command information storage section, wherein the television receiver performs the speech recognition of externally input speech information so as to be controlled based on the command information obtained by a result of the speech recognition.

In accordance with a second aspect of the invention, electric equipment includes: a command information storage section to store command information for controlling the electric equipment associated with a plurality of pieces of control information pertaining respectively to operation control in a plurality of operation states; a speech information obtainment section to obtain speech information; a command information extraction section to perform speech recognition of the speech information obtained by the speech information obtainment section so as to extract the corresponding command information stored in the command information storage section; a judgment section to judge the operation state of the electronic equipment when the command information is extracted by the command information extraction section; a control section to extract one of the plurality of pieces of control information associated with the command information extracted by the command information extraction section from the command information storage section based on the operation state of the electronic equipment judged by the judgment section so as to control the television receiver based on the extracted control information, wherein the electric equipment performs the speech recognition of externally input speech information so as to be controlled based on the command information obtained by a result of the speech recognition.

Preferably, the electronic equipment further includes: a setting section to set user-desired customized command information corresponding to speech information obtained by the speech information obtainment section; and a command information registration section to register the customized command information set by the setting section associated with a user-desired operation state of the electronic equipment and the control information corresponding to the user-desired operation state, in the command information storage section.

According to the first aspect of the invention, the command information storage section can store command information for controlling the television receiver associated with a plurality of pieces of control information pertaining respectively to operation control in a plurality of operation states. Speech information can be obtained by the speech information obtainment section. The command information stored in the command information storage section, by the command information extraction section, can be extracted by performing speech recognition of the speech information obtained by the speech information obtainment section. The operation state of the television receiver can be judged by the judgment section when the command information is extracted by the command information extraction section. The control information associated with the command information extracted by the command information extraction section based on the operation state of the television receiver judged by the judgment section is extracted from the command information storage section by the control section, and the control based on the control information can be performed by the control section.

Even if the same command information is input, suitable control can be thereby performed correspondingly to the operation state of the television receiver, and the number of input commands by speech information that a user should remember can be decreased.

Moreover, user-desired customized command information can be set by the setting section based on the speech information obtained by the speech information obtainment section. The command information registration section can register the customized command information set by the setting section associated with the operation state of the television receiver which the user desires and the control information corresponding to the operation state in the command information storage section.

Command information can be consequently customized to the command information that is easily understood by the user, and usability is better.

According to the second aspect of the invention, the command information storage section can store command information for controlling the electronic equipment associated with a plurality of pieces of control information pertaining respectively to operation control in a plurality of operation states. Speech information can be obtained by the speech information obtainment section. The command information stored in the command information storage section, by the command information extraction section, can be extracted by performing speech recognition of the speech information obtained by the speech information obtainment section. The operation state of the electronic equipment can be judged by the judgment section when the command information is extracted by the command information extraction section. The control information corresponding to the command information extracted by the command information extraction section based on the operation state of the electronic equipment judged by the judgment section is extracted from the command information storage section by the control section, and the control based on the control information can be performed by the control section.

Even if the same command information is input, suitable control can be thereby performed correspondingly to the operation state of the electronic equipment, and the number of input commands by speech information that a user should remember can be decreased.

Moreover, user-desired customized command information can be set by the setting section based on the speech information obtained by the speech information obtainment section. The command information registration section can register the customized command information set by the setting section associated with the operation state of the electronic equipment which the user desires and the control information corresponding to the operation state in the command information storage section.

Command information can be consequently customized to the command information that is easily understood by the user, and usability is better.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein:

FIG. 2 is a diagram showing an example of a command table in the present invention;

FIG. 3 is a flow chart showing the control operation of the equipment body unit in the present invention.

DETAILED DESCRIPTION OF THE PREFERRED EMBODIMENTS

Figure 1:
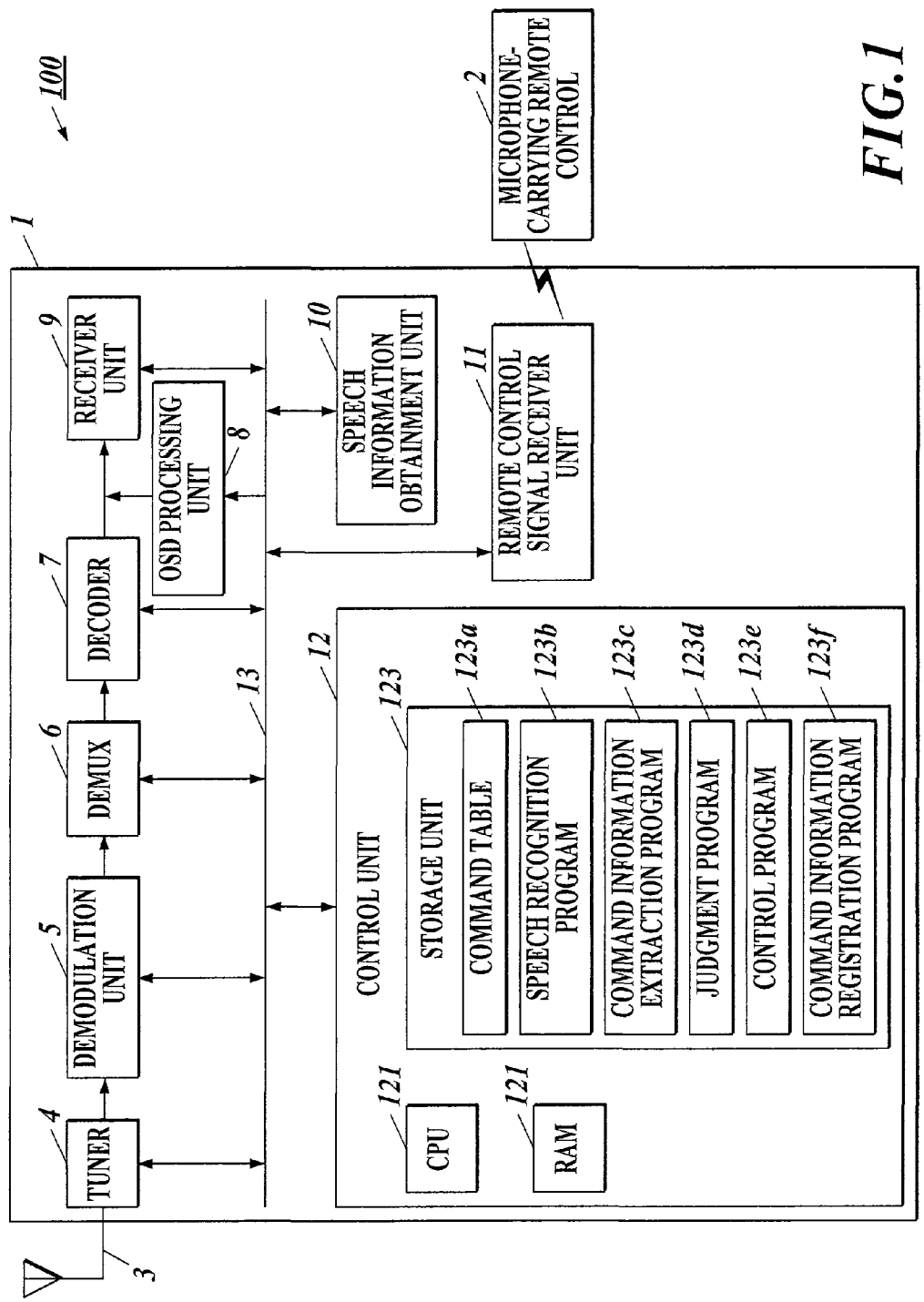
FIG. 1 is a block diagram showing the configuration of the principal part of a digital television receiver according to the present invention.

In the following, the embodiment of the present invention is described in detail with reference to the attached drawings.

Incidentally, a digital television receiver is exemplified as electronic equipment to be described. However, the electronic equipment is not limited to those shown ones, and for example, the electronic equipment may be consumer electrical appliances such as a video recorder or an air conditioner.

First, the configuration of the whole equipment and the configuration of the principal part are described with reference to FIG. 1.

A digital television receiver 100 of the present embodiment is configured to include an equipment body unit 1 receiving, for example, a television broadcast signal (hereinafter referred to as a broadcast signal), and converting the received broadcast signal into a predetermined output signal to output video/audio data, and a microphone-carrying remote control apparatus (hereinafter referred to as a microphone-carrying remote control) enabling a user to wirelessly output speech information to the equipment body unit 1 and to transmit an input operation signal by a depression operation of an operation key.

Next, the configuration of the principal part of the digital television receiver 100 is described.

The equipment body unit 1 is configured to include an antenna 3 receiving a broadcast signal, a tuner 4 tuning a broadcast signal of a predetermined broadcast channel among the broadcast signals received by the antenna 3, a demodulation unit 5 performing the demodulation and the error correction processing of a broadcast signal output from the tuner 4, a demultiplexer 6 obtaining video /audio data by separating and extracting each piece of data from the broadcast signal demodulated by the demodulation unit 5, a decoder 7 performing the expansion processing of the video/audio data obtained by the demultiplexer 6, an on-screen display (OSD) processing unit 8 as a display control section adding OSD data to the video data expanded by the decoder 7, a receiver unit 9 as a display section outputting the video /audio data processed by the decoder 7 and the OSD processing unit 8, a speech information obtainment unit 10 obtaining speech information, a remote control signal receiver unit 11 receiving an input operation signal generated by a depression operation of an operation key of the microphone-carrying remote control 2 and outputting the input operation signal to a control unit 12, the control unit 12 performing the integrated control of the whole equipment body unit 1, and a control bus 13 connecting each section with one another.

For example, a microphone is used as the speech information obtainment unit 10, and the speech information obtainment unit 10 obtains speech as it is as speech information.

The speech information obtainment unit 10 functions as a setting section by obtaining speech information in a desired customized command from the user.

Incidentally, the speech information obtainment unit 10 is not only designed for the case of obtaining speech as speech information as it is, but also may be designed so as to obtain a speech signal that has been converted from speech as speech information after the conversion.

The remote control signal receiver unit 11 receives an input operation signal such as an infrared ray that has been output by a user's depression operation of various keys provided to the microphone-carrying remote control 2, and outputs the input operation signal to the control unit 12.

The control unit 12 includes, for example, a central processing unit (CPU) 121, a random access memory (RAM) 122, a storage unit 123 and the like as shown in FIG. 1.

The CPU 121 performs various control operations in accordance with a command table and various processing program stored in the storage unit 123.

The RAM 122 includes a program storage area for expanding processing programs executed by the CPU 121, and a data storage area for storing input data and the processing results that are produced at the time of the execution of the processing programs.

The storage unit 123 stores a system program executable in the equipment body unit 1, various processing programs executable in the system program, the data used at the time of the execution of these various processing programs, the data of the processing results of operation processing by the CPU 121, and the like. Incidentally, the programs are stored in the storage unit 123 in the form of computer readable program codes.

To put it concretely, the storage unit 123 stores, for example, a command table 123a, a speech recognition program 123b, a command information extraction program 123c, a judgment program 123d, a control program 123e, a command information registration program 123f, and the like as shown in FIG. 1.

The command table 123a is a table storing command information for controlling the equipment body unit 1.

To put it concretely, the command table 123a stores command information for controlling the equipment body unit 1 associated with a plurality of pieces of control information pertaining respectively to operation control in a plurality of operation states.

To put it more concretely, as shown in FIG. 2, command information "there" for controlling the equipment body unit 1 is associated with a plurality of operation states such as "during video picture reception," "during continuous tuning with CH (channel) UP button," "during volume-up continuous operation" and the like, and is also associated with the corresponding processing contents such as "display a still image of present video picture," "interrupt tuning with CH UP button to tune present CH," "interrupt volume-up operation to set present audio volume" and the like, and with control information corresponding to the processing contents.

The storage unit 123 functions as a command information storage section by storing the command table 123a like this.

The speech recognition program 123b is a program enabling the CPU 121 to realize the function of performing speech recognition processing to the speech information obtained by the speech information obtainment unit 10.

For the speech recognition, for example, the speech recognition software called Julius is hereupon used, and the speech recognition is realized by accumulating statistical data of enormous speech patterns and language patterns. The basic principle of the speech recognition is to perform the recognition of speech by holding the frequency patterns of acoustic models (such as phonemes (each corresponding to almost one Roman character) and syllables (each corresponding to one kana letter)), and by performing the matching of an syllable sequence signal composed of the monosyllabic parts cut out of the speech waveform signal of an input speech with the held acoustic models while referring to a word dictionary.

The command information extraction program 123c is a program enabling the CPU 121 to realize the function of extracting command information agreeing with the command information based on a speech recognition result from the command table 123a.

To put it concretely, the CPU 121, for example, extracts one of the plurality of pieces of command information "there" agreeing with command information "there" obtained based on a speech recognition result from the command table 123a, as shown in FIG. 2, by executing the command information extraction program 123c.

The CPU 121 functions as a command information extraction section by executing the command information extraction program 123c like this.

The judgment program 123d is a program enabling the CPU 121 to realize the function of judging the operation state of the equipment body unit 1.

To put it concretely, the CPU 121 judges the operation state of the equipment body unit 1 based on the control information in the operation state when command information is extracted by the execution of the command information extraction program 123c, by executing the judgment program 123d.

The CPU 121 functions as a judgment section by executing the judgment program 123d like this.

The control program 123e is the program enabling the CPU 121 to realize the function of performing the control based on the command information obtained based on a speech recognition result, by executing the control program 123e.

To put it concretely, the CPU 121 executes the control program 123e to thereby extract one of the plurality of pieces of control information associated with the command information extracted by the execution of the command information extraction program 123c from the command table 123a based on the operation state of the equipment body unit 1, which is judged by the execution of the judgment program 123d, and to perform the control based on the control information.

The CPU 121 functions as a control section by executing the control program 123e like this.

The command information registration program 123f is a program enabling the CPU 121 to realize the function of registering user-desired customized command information in the command table 123a.

To put it concretely, the CPU 121 executes the speech recognition program 123b to the user-desired speech information obtained by the speech information obtainment unit 10 functioning as the setting section, and sets the obtained speech information as the customized command information. The CPU 121 executes the command information registration program 123f, and thereby specifies the user-desired operation state of the equipment body unit 1 and the control information corresponding to the operation state for the set customized command information by a depression operation of a direction instruction key (not shown) among the various operation keys provided in the microphone-carrying remote control 2. The CPU 121 then registers the customized command information associated with the specified operation state of the equipment body unit 1 and the control information corresponding to the operation state to register them in the command table 123a.

The CPU 121 functions as a command information registration section by executing the command information registration program 123f like this.

Next, the control operation of the equipment body unit 1 of the present invention is described with reference to FIG. 3.

First, in Step S1, the equipment body unit 1 is in a speech information obtainment waiting state. When the CPU 121, for example, judges that the speech information "there" is obtained by the speech information obtainment unit 10 (Step S1; Yes), the CPU 121 advances the processing thereof to Step S2. On the other hand, when the CPU 121 judges that no speech information is obtained (Step S1; No), the CPU 121 repeatedly enters the speech information obtainment waiting state.

Next, in Step S2, the CPU 121 executes the speech recognition program 123b, and thereby performs the speech recognition of the obtained speech information "there."

Next, in Step S3, the CPU 121 executes the command information extraction program 123c, and thereby extracts one of the plurality of pieces of command information corresponding to the command information based on the speech recognition result from the command table 123a. To put it concretely, in Step S3, if the CPU 121 executes the command information extraction program 123c and thereby, for example, the command information "there" is extracted (Step S3; Yes), the CPU 121 advances the processing thereof to Step S4. On the other hand, in Step S3, if the CPU 121 executes the command information extraction program 123c and thereby the corresponding command information is not extracted (Step S3; No), the CPU 121 ends the present processing.

Next, in Step S4, the CPU 121 executes the judgment program 123d, and thereby judges the operation state of the equipment body unit 1 to advance the processing thereof to Step S5.

In Step S5, if the CPU 121 executes the judgment program 123d and as the result thereof the judged operation state of the equipment body unit 1 corresponds to the operation state stored in the command table 123a (Step S5; Yes), the CPU 121 advances the processing thereof to Step S6. On the other hand, in Step S5, if the CPU 121 executes the judgment program 123d and as the result thereof the judged operation state of the equipment body unit 1 does not correspond to the operation state stored in the command table 123a (Step S5; No), the CPU 121 ends the present processing.

To put it concretely, for example, if the equipment body unit 1 is in the operation state "during video picture reception" when the CPU 121 executes the command information extraction program 123c and thereby the command information "there" is extracted, the operation state corresponds to the operation state stored in the command table 123a (see FIG. 2). On the other hand, if the equipment body unit 1 is in the operation state "mute state" when the command information "there" is extracted, the operation state does not correspond to any of the operation states stored in the command table 123a (see FIG. 2), and the CPU 121 ends the present processing.

Next, in Step S6, the CPU 121 executes the control program 123e, and thereby extracts the control information corresponding to the operation state of the equipment body unit 1, which is judged by the execution of the judgment program 123d, from the command table 123a to perform the control based on the control information. The CPU 121 then ends the present processing.

To put it concretely, for example, if the equipment body unit 1 is in the operation state "during video picture reception" when the CPU 121 executes the command information extraction program 123c and thereby the command information "there" is extracted as the example mentioned above, then the CPU 121 extracts the control information pertaining to the processing content "display a still image of present video picture" corresponding to the operation state "during video picture reception" from the command table 123a, and performs the control based on the control information. The CPU 121 then ends the present processing.

Figure 4:
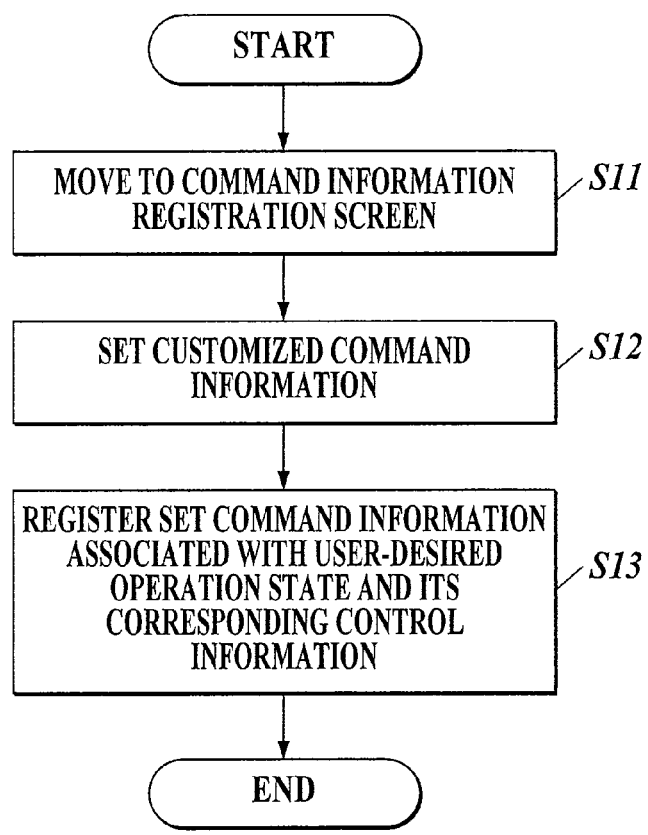
FIG. 4 is a flow chart showing the registration operation of a command table in the present invention.

Next, the registration operation of customized command information to the command table 123a of the equipment body unit 1 of the present invention is described with reference to FIG. 4.

First, in Step S11, the CPU 121 executes the command information registration program 123f based on the input of a depression signal generated by a user's depression of a registration key (not shown) among the various keys equipped in the microphone-carrying remote control 2, for example, and thereby the CPU 121 performs the transition to a command information registration screen.

Next, in Step S12, a user utters a desired customized command, and thereby the speech information obtainment unit 10 functioning as the setting section obtains the speech information of the customized command, and the speech information obtained by the execution of the speech recognition program 123b by the CPU 121 is set as the customized command information.

To put it concretely, for example, if a user wants to set the command information "Yes" as the customized command information, the user utters "Yes," and thereby the speech information obtainment unit 10 obtains the speech information "Yes," and the speech information "Yes" obtained by the execution of the speech recognition program 123b by the CPU 121 is set as the customized command information.

Next, in Step S13, the user-desired operation state of the equipment body unit 1 associated with the set user-desired customized command information and the control information corresponding to the operation state is specified by a depression operation of the direction instruction key (not shown) or the like among the various operation keys equipped in the microphone-carrying remote control 2, and by the depression operation of the registration key (not shown) of the microphone-carrying remote control 2, the registration in the command table 123a is completed. The present processing thereby ends.

To put it concretely, for example, if the user wants to perform the customization so as to set the digital television receiver 100 to the mute state thereof by inputting customized command information "Yes" when the operation state of the equipment body unit 1 is the "during video picture reception," and to return the audio volume thereof to the original state by inputting the customized command information "Yes" when the operation state of the equipment body unit 1 is the "mute state," then the user performs the depression operation of the direction instruction key (not shown) equipped in the microphone-carrying remote control 2 to specify the operation state "during video picture reception" of the equipment body unit 1 and the processing content "setting to mute state" corresponding to the operation state among the operation state information and the processing content information that are stored in the storage unit 123, and similarly to specify the operation state "mute state" of the equipment body unit 1 and the processing content "return audio volume to original state" corresponding to the operation state. The user then performs the depression operation of the registration key (not shown) of the microphone-carrying remote control 2 to thereby complete the registration in the command table 123a.

By the digital television receiver 100 according to the present invention described above, the command table 123a can store command information for controlling the digital television receiver 100 associated with the control information pertaining respectively to operation control in a plurality of operation states. Speech information can be obtained by the speech information obtainment unit 10. The CPU 121 executes the command information extraction program 123c to thereby enable the speech recognition of the speech information obtained by the speech information obtainment unit 10 for extracting the command information stored in the command table 123a. The CPU 121 executes the judgment program 123d to thereby enable the judgment of the operation state of the digital television receiver 100 when command information is extracted by the execution of the command information extraction program 123c. The CPU 121 executes the control program 123e, and thereby the CPU 121 can extract, from the command table 123a, one of the plurality of pieces of control information associated with command information extracted by the execution of the command information extraction program 123c by the CPU 121 based on the operation state of the digital television receiver 100 judged by the execution of the judgment program 123d for enabling the control based on the control information.

Even if the same command information is input, it then becomes possible to perform suitable control corresponding to the operation state of the digital television receiver 100, the number of the input commands by speech information that a user should remember can be decreased.

Moreover, user-desired customized command information can be set by the speech information obtained by the speech information obtainment unit 10. The CPU 121 executes the command information registration program 123f, and thereby user-desired operation state in the digital television receiver 100 and the control information corresponding to the operation state can be registered, to the set customized command information, in the command table 123a.

Consequently, the command information can be customized to the command information that is easy for a user to understand, and thereby better usability is realized.

Incidentally, the present invention is not limited to the embodiment described above, and various improvements and changes of design may be performed without departing from the sprit of the present invention.

For example, the setting section may be designed to perform the setting not only in the case where the customized command information is set by the obtainment of speech information by the speech information obtainment section, but also in the case of the depression operation by various operation keys equipped in the microphone-carrying remote control or the like.

Moreover, if no corresponding command information is extracted from the command information storage section by the command information extraction section, the design of displaying the fact that the command information did not extracted on the display section may be adopted.

Moreover, for example, the design of storing acoustic-model patterns pertaining to the frequency patterns of the speech signals suitable for each user in the storage section in advance to perform speech recognition using the acoustic model patterns suitable for each user may be adopted. More accurate speech recognition can be thereby performed.

The entire disclosure of Japanese Patent Application No. 2006-152045 filed on May 31, 2006, including description, claims, drawings and summary are incorporated herein by reference in its entirety.

What is claimed is:

1. A television receiver comprising:
a command information storage section including a command table which stores at least one piece of command information for controlling the television receiver, a plurality of operation states of the television receiver which correspond to each piece of the command information, and a plurality of processing contents which correspond to the operation states respectively;
a speech information obtainment section to obtain speech information;
a command information extraction section to perform speech recognition of the speech information obtained by the speech information obtainment section so as to extract one piece of the command information stored in the command information storage section;
a judgment section to judge a current operation state of the television receiver and to judge whether the current operation state corresponds to one of the operation states stored in the command table when the one piece of the command information is extracted by the command information extraction section;
a control section to execute, when the current operation state corresponds to one of the stored operation states as a judgment result by the judgment section, one processing content which corresponds to the one of the stored operation states among the stored processing contents, and not to execute, when the current operation state does not correspond to any of the stored operation states as the judgment result by the judgment section, any of the stored processing contents and end a control of the television receiver based on the command information;
a setting section to set user-desired customized command information corresponding to the speech information obtained by the speech information obtainment section; and
a command information registration section to register the customized command information set by the setting section associated with a user-desired operation state of the television receiver and a processing content corresponding to the user-desired operation state, in the command table of the command information storage section,
wherein the television receiver performs the speech recognition of externally input speech information so as to be controlled based on the command information obtained by a result of the speech recognition.

2. The television receiver according to claim 1, wherein the extracted one piece of command information is THERE, the operation states which correspond to the command information of THERE are during video picture reception, during continuous tuning with channel up button and during volume-up continuous operation, and the processing contents which correspond to the operation states of during video picture reception, during continuous tuning with channel up button, and during volume-up continuous operation are display still image of present video picture, interrupt tuning with channel up button to tune present channel and interrupt volume-up operation to set present audio volume, respectively.

3. Electronic equipment comprising:
a command information storage section including a command table which stores at least one piece of command information for controlling the electric equipment, a plurality of operation states of the electric equipment which correspond to each piece of the command information, and a plurality of processing contents which correspond to the operation states respectively;

a speech information obtainment section to obtain speech information;

a command information extraction section to perform speech recognition of the speech information obtained by the speech information obtainment section so as to extract one piece of the command information stored in the command information storage section;

a judgment section to judge a current operation state of the electronic equipment and to judge whether the current operation state corresponds to one of the operation states stored in the command table when the one piece of the command information is extracted by the command information extraction section;

a control section to execute, when the current operation state corresponds to one of the stored operation states as a judgment result by the judgment section, one processing content which corresponds to the one of the stored operation states among the stored processing contents, and not to execute, when the current operation state does not correspond to any of the stored operation states as the judgment result by the judgment section, any of the stored processing contents and end a control of the electric equipment based on the command information wherein the electric equipment performs the speech recognition of externally input speech information so as to be controlled based on the command information obtained by a result of the speech recognition.

4. The electronic equipment according to claim 3, wherein the extracted one piece of command information is THERE, the operation states which correspond to the command information of THERE are during video picture reception, during continuous tuning with channel up button and during volume-up continuous operation, and the processing contents which correspond to the operation states of during video picture reception, during continuous tuning with channel up button, and during volume-up continuous operation are display still image of present video picture, interrupt tuning with channel up button to tune present channel and interrupt volume-up operation to set present audio volume, respectively.

5. The electronic equipment according to claim 3, further comprising:

a setting section to set user-desired customized command information corresponding to speech information obtained by the speech information obtainment section; and a command information registration section to register the customized command information set by the setting section associated with a user-desired operation state of the electronic equipment and a processing content corresponding to the user-desired operation state, in the command table of the command information storage section.

6. The electronic equipment according to claim 3, wherein the extracted one piece of command information is THERE, the operation states which correspond to the command information of THERE are during video picture reception, during continuous tuning with channel up button and during volume-up continuous operation, and the processing contents which correspond to the operation states of during video picture reception, during continuous tuning with channel up button, and during volume-up continuous operation are display still image of present video picture, interrupt tuning with channel up button to tune present channel and interrupt volume-up operation to set present audio volume, respectively.

* * * * *